J. W. Colburn.

Insect Destroyer.

Nº 87,911.          Patented Mar. 16, 1869.

Witnesses;

Inventor;
James W Colburn
per
Alexander _____
Atty

United States Patent Office.

JAMES W. COLBURN, OF ROSE, NEW YORK.

Letters Patent No. 87,911, dated March 16, 1869.

---

IMPROVEMENT IN DEVICE FOR PROTECTING YOUNG PLANTS AGAINST WORMS.

---

The Schedule referred to in these Letters Patent and making part of the same.

---

*To all whom it may concern:*

Be it known that I, JAMES W. COLBURN, of Rose, in the county of Wayne, and in the State of New York, have invented certain new and useful Improvements in Worm-Traps; and do hereby declare that the following is a full, clear, and exact description thereof, reference being had to the accompanying drawings, and to the letters of reference marked thereon.

The nature of my invention consists in the construction of a device for making a series or number of holes in the ground, around any plant, but more particularly corn-sprouts, so that during the night, while worms try to get at the plants, they will fall into said holes, and not reach the plant.

In order to enable others skilled in the art to which my invention appertains, to make and use the same, I will now proceed to describe its construction and operation, referring to the annexed drawings, which form a part of this specification, and in which—

Figure 1:
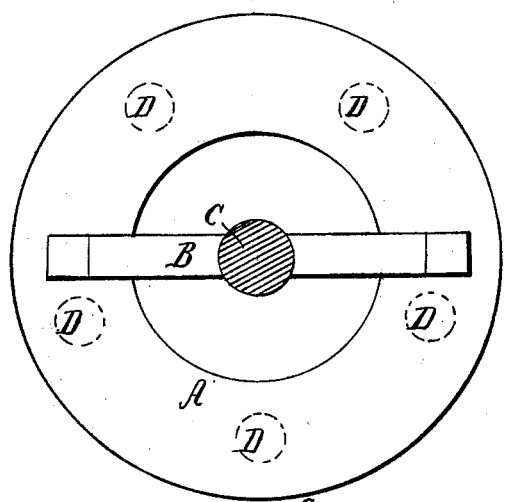
Figure 2:
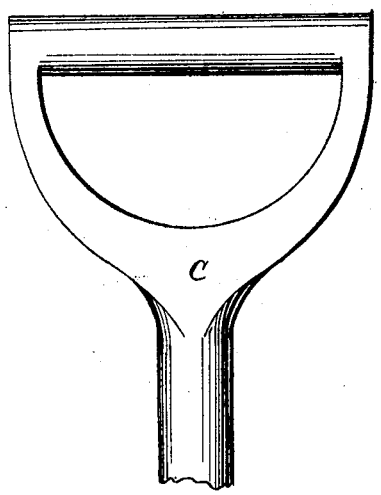

Figure 1 is a plan view;

Figure 2, a section of the handle; and

Figure 3:
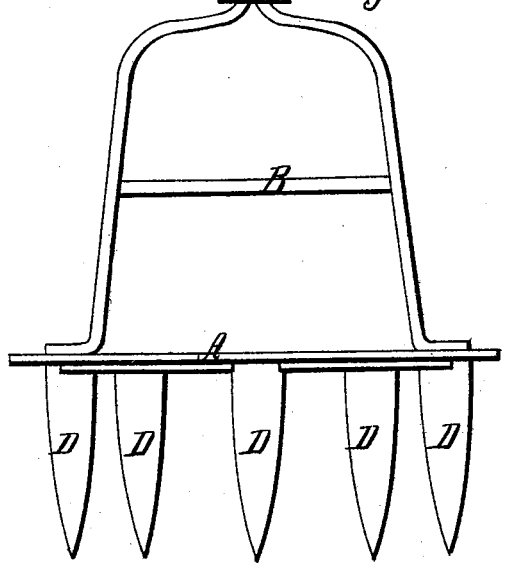

Figure 3, a side view of the machine.

A represents a plate, of suitable dimensions, having a round hole through its centre. This plate I prefer making round, but it may be of any shape desired.

On the upper side of the plate A, a stirrup, B, is secured, to the upper end of which stirrup the handle C is secured, in any manner desired.

To the under side of the plate A is secured a number of tapering, round teeth, D D. Any number of teeth may be used.

The object of this device is to make a number of holes around plants of any kind that are liable to be injured by worms.

For this purpose, the plate, with the teeth, is placed above the plant, so that the plant will protrude through the centre opening, and the teeth surround the same.

The opening in the plate A may not necessarily be round, although I prefer to make it so.

By pressure, by the hand, on the handle C, and by the foot on the stirrup B, the teeth D D are sunk into the ground to any desired depth, making a number of tapering holes around the plant. When, now, during the night, worms crawl toward the plant, they will fall into these holes, which holes thus form worm-traps.

This device may be used for various purposes. I may, for instance, use it for making holes or drills, and planting hops or other articles.

Between each of the teeth D is an under projection, all around the under plate, which forms a circumferential, or other-shaped track, or indentation in the earth, after the holes have been formed, so that the worms, after travelling through the same, will fall into one hole after the other.

Having thus fully described my invention,

What I claim as new, and desire to secure by Letters Patent, is—

1. The plate A, having an opening, or aperture through the centre, and provided, on its under side, with a number of teeth, D D, substantially as and for the purposes herein set forth.

2. The combination of the plate A with its teeth D D and stirrup B, all constructed and arranged to operate substantially as and for the purposes herein set forth.

In testimony that I claim the foregoing, I have hereunto set my hand, this 2d day of March, 1869.

JAMES W. COLBURN.

Witnesses:
LEOPOLD EVERT,
CORNELIUS COX.